United States Patent
Chen et al.

(10) Patent No.: US 12,540,366 B2
(45) Date of Patent: *Feb. 3, 2026

(54) HEAT TREATMENT OF HIGH STRENGTH COLD ROLLED STEEL STRIP

(71) Applicant: TATA STEEL IJMUIDEN B.V., Velsen-Noord (NL)

(72) Inventors: Shangping Chen, Beverwijk (NL); Richard Mostert, Heemskerk (NL); Maxim Peter Aarnts, Castricum (NL); Stefanus Matheus Cornelis Van Bohemen, Leiden (NL)

(73) Assignee: TATA STEEL IJMUIDEN B.V., Velsen-Noord (NL)

( * ) Notice: Subject to any disclaimer, the term of this patent is extended or adjusted under 35 U.S.C. 154(b) by 547 days.

This patent is subject to a terminal disclaimer.

(21) Appl. No.: 17/596,682

(22) PCT Filed: Jun. 11, 2020

(86) PCT No.: PCT/EP2020/066212
§ 371 (c)(1),
(2) Date: Dec. 16, 2021

(87) PCT Pub. No.: WO2020/254188
PCT Pub. Date: Dec. 24, 2020

(65) Prior Publication Data
US 2022/0316025 A1   Oct. 6, 2022

(30) Foreign Application Priority Data
Jun. 17, 2019 (EP) .................................... 19180701

(51) Int. Cl.
*C21D 9/52* (2006.01)
*C21D 6/00* (2006.01)
(Continued)

(52) U.S. Cl.
CPC ............... *C21D 9/52* (2013.01); *C21D 6/002* (2013.01); *C21D 6/005* (2013.01); *C21D 6/008* (2013.01);
(Continued)

(58) Field of Classification Search
CPC ........ C21D 2211/002; C21D 2211/005; C21D 2211/008; C21D 8/0247; C21D 9/52;
(Continued)

(56) References Cited

U.S. PATENT DOCUMENTS 9,650,708 B2    5/2017  Becker et al.
2010/0108200 A1*  5/2010  Futamura ................ C22C 38/16
                                                                  148/320

(Continued)

FOREIGN PATENT DOCUMENTS

CN    108603271 A    9/2018
CN    108699660 A    10/2018
(Continued)

OTHER PUBLICATIONS

International Search Report and Written Opinion mailed Oct. 21, 2020 for PCT/EP2020/066207 to Tata Steel Ijmuiden B.V. filed Jun. 11, 2020.

(Continued)

*Primary Examiner* — Nicholas A Wang
(74) *Attorney, Agent, or Firm* — Vorys, Sater, Seymour and Pease LLP; Anthony P. Venturino; Maryellen Feehery Hank

(57) ABSTRACT

A heat treatment of a high strength cold rolled steel strip includes the steps of
  a) soaking a cold rolled steel strip,
  b) cooling the soaked steel strip
  c) heat treating the cooled strip;
  d) cooling the heat treated steel strip to ambient temperature range;
(Continued)

such that the steel strip has a microstructure including various ferrites, retained austenite and martensite. The main components in the steel composition include carbon, manganese, silicon and aluminium in addition to iron.

15 Claims, 2 Drawing Sheets

(51) Int. Cl.
    *C21D 8/02*     (2006.01)
    *C22C 38/00*     (2006.01)
    *C22C 38/02*     (2006.01)
    *C22C 38/06*     (2006.01)
    *C22C 38/20*     (2006.01)
    *C22C 38/22*     (2006.01)
    *C22C 38/24*     (2006.01)
    *C22C 38/26*     (2006.01)
    *C22C 38/28*     (2006.01)
    *C22C 38/38*     (2006.01)
    *C23C 2/40*     (2006.01)

(52) U.S. Cl.
    CPC ......... *C21D 8/0205* (2013.01); *C21D 8/0278* (2013.01); *C22C 38/001* (2013.01); *C22C 38/002* (2013.01); *C22C 38/02* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/38* (2013.01); *C23C 2/40* (2013.01); *C21D 2211/005* (2013.01)

(58) Field of Classification Search
    CPC ........ C21D 6/002; C21D 6/005; C21D 6/008; C21D 8/0205; C21D 2211/001; C21D 8/0236; C21D 8/0278; C21D 6/004
    See application file for complete search history.

(56) References Cited

U.S. PATENT DOCUMENTS

| | | | |
|---|---|---|---|
| 2011/0146852 A1 | 6/2011 | Matsuda et al. | |
| 2011/0162762 A1* | 7/2011 | Matsuda ............. | C21D 9/48 148/333 |
| 2011/0198002 A1 | 8/2011 | Nakagaito et al. | |
| 2014/0242415 A1* | 8/2014 | Azuma ............. | C21D 8/0226 148/504 |
| 2014/0305553 A1 | 10/2014 | Masuda et al. | |
| 2014/0322559 A1 | 10/2014 | Becker et al. | |
| 2015/0101712 A1 | 4/2015 | Futamura et al. | |
| 2015/0167133 A1* | 6/2015 | Paul ............. | C22C 38/20 148/330 |
| 2015/0184274 A1* | 7/2015 | Kakiuchi ............. | C22C 38/001 148/533 |
| 2016/0208359 A1 | 7/2016 | Kasuya et al. | |
| 2016/0237520 A1 | 8/2016 | Murata et al. | |
| 2017/0130292 A1 | 5/2017 | Mohanty et al. | |
| 2017/0137910 A1 | 5/2017 | Girina et al. | |
| 2017/0191150 A1* | 7/2017 | Hanlon ............. | C22C 18/00 |
| 2018/0010207 A1 | 1/2018 | Futamura et al. | |
| 2019/0040482 A1 | 2/2019 | Kimata et al. | |
| 2019/0040483 A1 | 2/2019 | Kimata et al. | |
| 2019/0338388 A1 | 11/2019 | Pipard et al. | |
| 2020/0040420 A1 | 2/2020 | Minami et al. | |
| 2020/0190612 A1 | 6/2020 | Kwak et al. | |
| 2020/0283869 A1* | 9/2020 | Toda ............. | C22C 38/28 |
| 2021/0262069 A1 | 8/2021 | Irnich et al. | |
| 2022/0205058 A1 | 6/2022 | Chen et al. | |
| 2022/0316021 A1 | 10/2022 | Chen et al. | |
| 2022/0316024 A1 | 10/2022 | Chen et al. | |
| 2022/0316026 A1 | 10/2022 | Chen et al. | |

FOREIGN PATENT DOCUMENTS

| | | |
|---|---|---|
| CN | 109295389 A | 2/2019 |
| EP | 1870482 A1 | 12/2007 |
| EP | 2267176 A1 | 12/2010 |
| EP | 2325346 A1 | 5/2011 |
| EP | 2436794 A1 | 4/2012 |
| EP | 2546375 A1 | 1/2013 |
| EP | 2546382 A1 | 1/2013 |
| EP | 2765212 A1 | 8/2014 |
| EP | 2831299 A1 | 2/2015 |
| EP | 2881481 A1 | 6/2015 |
| EP | 3144406 A1 | 3/2017 |
| EP | 2831296 B1 | 8/2017 |
| EP | 3581670 A1 | 12/2019 |
| EP | 3712284 A1 | 9/2020 |
| EP | 3754035 A1 | 12/2020 |
| EP | 3963115 | 3/2022 |
| JP | 2010090475 A | 4/2010 |
| JP | 2013072101 A | 4/2013 |
| JP | 2013124399 A | 6/2013 |
| JP | 2013124400 A | 6/2013 |
| JP | 2014047395 A | 3/2014 |
| JP | 2015516511 A | 6/2015 |
| JP | 2015200006 A | 11/2015 |
| JP | 2016130358 A | 7/2016 |
| JP | 2017528592 A | 9/2017 |
| KR | 1020170078541 A | 7/2017 |
| KR | 101877787 B1 | 7/2018 |
| WO | 2012156428 A1 | 11/2012 |
| WO | 2013144373 A1 | 10/2013 |
| WO | 2013144377 A1 | 10/2013 |
| WO | 2013146087 A1 | 10/2013 |
| WO | 2016001707 A1 | 1/2016 |
| WO | 2016001898 A2 | 1/2016 |
| WO | 2017108959 A1 | 6/2017 |
| WO | 2017125809 A1 | 7/2017 |
| WO | 2017138503 A1 | 8/2017 |
| WO | 2018099819 A1 | 6/2018 |
| WO | 2018110867 A1 | 6/2018 |
| WO | 2018115933 A1 | 6/2018 |
| WO | 2018115936 A1 | 6/2018 |
| WO | WO2018116155 * | 6/2018 |
| WO | 2018147400 A1 | 8/2018 |
| WO | 2019063081 A1 | 4/2019 |
| WO | 2019097600 A1 | 5/2019 |
| WO | 2019238741 A1 | 12/2019 |
| WO | 2020221889 A1 | 11/2020 |
| WO | 2020254186 A1 | 12/2020 |
| WO | 2020254187 A1 | 12/2020 |
| WO | 2020254190 A1 | 12/2020 |

OTHER PUBLICATIONS

International Search Report and Written Opinion mailed Oct. 21, 2020 for PCT/EP2020/066208 to Tata Steel Ijmuiden B.V. filed Jun. 11, 2020.
International Search Report and Written Opinion mailed Oct. 9, 2020 for PCT/EP2020/066212 to Tata Steel Ijmuiden B.V. filed Jun. 11, 2020.
International Search Report and Written Opinion mailed Oct. 21, 2020 for PCT/EP2020/066216 to Tata Steel Ijmuiden B.V. filed Jun. 11, 2020.
A.-F. Gourguesh. M. Flowert. C. Lindley, Materials Science and Technology, vol. 16, Jan. 2000 (Jan. 1, 2000), pp. 26-40.
Notification of Reason for Rejection mailed Jul. 2, 2024 for Japanese Patent Application No. 2021-575076, filed Jun. 11, 2020.
Notification of Reason for Rejection mailed Jul. 2, 2024 in Japanese Patent Application No. 2021-575078 (Translation of Official Action).
Guhui Gao et al: "A carbide-free bainite/martensite/austenite triplex steel with enhanced mechanical properties treated by a novel quenching-partitioning-tempering process", Materials Science and Engineering A, vol. 559, Jan. 1, 2013, pp. 165-169, XP055176061, ISSN: 0921-5093.
J. Goldstein et al., Scanning Electron Microscopy and X-Ray Microanalysis, Springer, New York, pp. 147-164, Published on Nov. 18, 2017.

(56) References Cited

OTHER PUBLICATIONS

Yang, B. J. et al., "Simulation of steel microstructure evolution during induction heating", 2010, Materials science and engineering A 527, pp. 2978-2984 (Year: 2010).

* cited by examiner (a) (b)

HEAT TREATMENT OF HIGH STRENGTH COLD ROLLED STEEL STRIP

CROSS-REFERENCE TO RELATED APPLICATIONS

This is a § 371 National Stage Application of International Application No. PCT/EP2020/066212 filed on Jun. 11, 2020, claiming the priority of European Patent Application No. 19180701.5 filed on Jun. 17, 2019.

FIELD OF THE INVENTION

The present invention relates to a method of heat treating a high strength cold rolled steel strip.

BACKGROUND OF THE INVENTION

In the art various types of cold rolled steels and manufacturing processes have been proposed for meeting the requirements in automotive applications. E.g. extra low carbon steel is used in automotive steel strip in view of its formability. This steel type shows a tensile strength in the range of 280-380 MPa.

HSLA (high strength low alloy) steels contain microalloying elements. They are hardened by a combination of precipitation and grain refining.

Advanced high strength steels (AHSS), such as dual phase (DP) steels and transformation induced plasticity (TRIP) steels, are currently typical of high-ductility, high-strength steels that are used in the automotive manufacturing industry. In DP steels the presence of martensite within a ferrite matrix enables a tensile strength higher than 450 MPa combined with good cold formability to be obtained.

To achieve simultaneously a high yield strength/tensile strength ratio and an even higher tensile strength, i.e., above 800 MPa, steels having complex (CP) microstructures including ferrite, bainite, martensite and/or retained austenite have been developed. However, due to the difference of the deformation capabilities between the ferrite, bainite or martensite structures and the retained austenite structure, these steels are generally inferior in stretch flange formability. Therefore their use is limited to automobile parts which do not require high formability.

TRIP type tempered martensitic steel (Q&P steel through quench and partitioning) that consists of tempered martensite as the matrix phase and residual austenite, and TRIP type bainitic ferrite steel (TBF steel through austempering) that consists of bainitic ferrite as the matrix phase and residual austenite have advantages such as the capability to provide high strength due to the hard tempered martensite and/or bainitic ferrite structure, and the capability to show outstanding elongation because the matrix is carbide-free, and fine residual austenite grains can be easily formed at the boundary of lath-shaped bainitic ferrite in the bainitic ferrite structure. Therefore, carbide-free bainitic ferrite or tempered martensitic steels are expected to achieve good stretch flangeability due to their uniform fine lath structure. The heterogeneities of hardness due to the presence of only a small amount of martensite in these microstructures will allow these steel types to achieve good deep drawability.

However, due to the limitations of current continuous production lines, the expected beneficial combination of the strength and ductility properties could not be obtained with current available steel recipes. These limitations comprise inter alia that the reheating furnace of current facilities of continuous annealing (CA) and continuous galvanizing (CG) lines are often only suitable for subjecting the steel strips to an intercritical or recrystallization heat treatment. For example, in some current annealing lines the maximum annealing temperature is limited to 890° C. Furthermore the cooling rates in the current CA/CG lines are limited within a fixed range. Also the available overageing time for many CA/CG lines is limited, e.g. this time span is less than about 160 seconds, which puts serious time limits to completion of any desired transformation during overageing.

E.g. WO2013/144373A1 has disclosed a cold rolled TRIP steel with a matrix of polygonal ferrite having a specific composition comprising chromium and a particular microstructure and having a tensile strength of at least 780 MPa, which is said to allow production thereof in a conventional industrial annealing line having an overageing/austempering section. That is to say for a relatively high overageing/austempering temperature the austempering time could be less than 200 seconds.

EP2831296B1 and EP2831299 have disclosed TBF steels, having a tensile strength of at least 980 MPa which could also be produced on a conventional production line. However, the preferred overageing/austempering times being 280-320 seconds, are too long to allow production on quite a number of conventional production lines. In other words, the bainitic transformation kinetics is too slow to complete the bainitic transformation in the limited time span in the overageing section to obtain the required microstructure in a conventional production line.

SUMMARY OF THE INVENTION

An object of the invention is to provide a cold rolled steel strip having a desired combination of high tensile strength (TS) and high total elongation (TE) properties at reasonable yield strength (YS), such as TS≥850 MPa; TE≥14% and/or YS≥500 MPa, in particular a steel strip for use in automotive applications, or a suitable alternative.

A further object of the invention is to provide a method for heat treating a cold rolled steel strip for obtaining the desired combination of properties as mentioned above, in particular a heat treatment that can be carried out using existing production lines, or a suitable alternative.

Another object of the invention is to provide a high silicon cold rolled steel strip having a desired combination of properties, which can be made on conventional industrial production lines.

Yet another object of the invention is to provide a steel composition for a high strength cold rolled steel strip and heat treatment thereof allowing to complete the bainitic transformation in a conventional production line in order to obtain a desired microstructure.

In view thereof the invention provides a method of heat treating a cold rolled steel strip, which method comprises the steps of:
a) soaking a cold rolled steel strip above (Ac3−60) for a soaking time t2 of 1-150 seconds, thereby obtaining a cold rolled steel strip having an at least partially austenitic microstructure;
b) cooling the soaked steel strip resulting from step a) to a temperature T4 in the range of Bn-Ms;
c) heat treating the cooled strip obtained in step b) in a temperature range of Bs-T4, for a period of time t5 of 30-300 seconds;
d) cooling the heat treated steel strip to ambient temperature;

such that the steel strip has a microstructure (in vol. %) comprising

| | |
|---|---|
| polygonal ferrite (PF) + acicular ferrite (AF) + higher bainitic ferrite (HBF): | 20-55; |
| wherein polygonal ferrite (PF): | 0-45; |
| lower bainitic ferrite (LBF): | 20-65; |
| retained austenite (RA): | 5-20; |
| martensite (M): | 0-20; | wherein the steel strip has a composition (in mass %) comprising
C: 0.15-0.35;
Mn: 1.50-3.00;
Si: 0.50-2.00;
Al: 0.01-1.50;
P: less than 0.050;
S: less than 0.020;
N: less than 0.0080;
wherein the sum (Si+Al) is ≥0.60; and
optionally one or more elements selected from
0<Cr≤0.35;
0<Cu≤0.20;
0<Ni≤0.50;
0<Mo≤0.30;
0<Nb≤0.10;
0<V≤0.10;
0<Ti≤0.10;
0<B≤0.0030;
0<Ca≤0.0050;
0<REM≤0.0100, wherein REM is one or more rare earth metals;
and the remainder being iron and inevitable impurities.

The method of the invention allows producing a cold rolled steel strip having a specific composition and microstructure and a combination of properties desirable for automotive parts requiring high strength, formability and weldability.

The invention solves the problem of the slow bainitic transformation kinetics by introducing a suitable amount of pro-eutectoid ferrite and controlling the morphology of it, by obtaining fine grains of the austenite through controlling the top annealing temperature and time, and by using a modified overageing process in a production line.

This method according to the invention can be performed using existing continuous annealing and galvanizing lines within the limitations regarding top temperature in the annealing section, cooling rate ranges and overageing time window at production speeds that are typical to these production lines.

The heat treated cold rolled steel strip may be Zn coated, e.g. by hot dip galvanizing or electrogalvanizing. A hot dip galvanizing step can be integrated easily in the heat treatment according to the invention.

The terms used to describe the critical transformation temperatures of a steel are given as follows, as well known to a person skilled in the art.

Ae3: Equilibrium temperature for transformation of ferrite into austenite and austenite into ferrite.

Ac3: Temperature at which, during heating, transformation of the ferrite into austenite ends.

Ac3 is usually higher than Ae3, but tends towards Ae3 as the heating rate tends to zero. In this invention, Ac3 is measured at a heating rate of 3° C./s.

Ar3: Temperature at which austenite begins to transform to ferrite during cooling.

Bs: Temperature at which, during cooling, transformation of the austenite into bainite starts.

Bn: Nose temperature of the bainitic transformation in the time-temperature transformation (TTT) curve of a steel, at which transformation of the austenite into bainite has the fastest kinetics.

Ms: Temperature at which, during cooling, transformation of the austenite into martensite starts.

Mf: Temperature at which, during cooling, transformation of the austenite into martensite ends. A practical problem with Mf is that the martensite fraction during cooling approaches the maximum achievable amount only asymptotically, meaning that martensite formation continues to very low temperatures. For practical reasons and in the context of this invention, Mf is therefore taken as the temperature at which 90% of the maximum achievable amount of martensite has been formed.

These critical phase transformation temperatures can be determined by dilatometer experiments. Alternatively, the Ac3, Bs and Ms points of the steel according to the invention can be calculated beforehand based on its composition, using commercial software such as JmatPro, or using the following empirical formulae:

$$Ac3(° C.)=942-260C+35Si-35Mn+125Al-11Cr-14Cu$$

$$Bs(° C.)=839-86Mn-23Si-67Cr+35\sqrt{Al}-270(1-\exp(-1.33C))$$

$$Ms(° C.)=539-423C-30.4Mn-7.5Si+30Al$$

In these formulae, the component X of the steel composition is represented in wt. %.

In this specification all temperatures are represented in degrees Celsius, all compositions are given in weight percentage (wt. %) and all the microstructures are given in volume percentage (vol. %), except where explicitly indicated otherwise.

DETAILED DESCRIPTION

Figure 1:
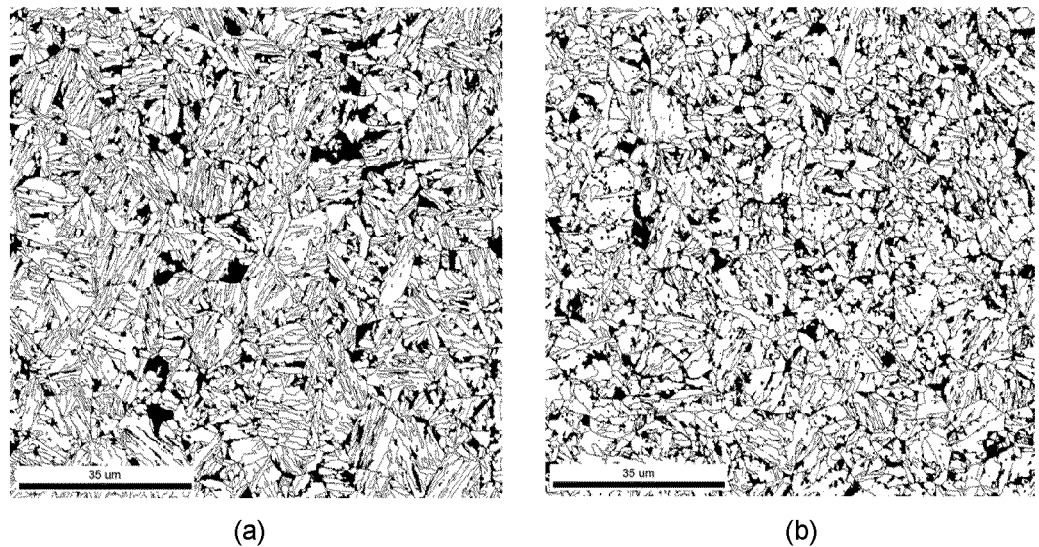
FIG. 1 is an EBSD map showing characteristics of the bainitic ferrite microstructures of a low temperature bainitic ferrite (FIG. 1a) and a high temperature bainitic ferrite (FIG. 1b) respectively.

Below an explanation of the composition, the method steps and microstructure according to the invention is presented.

Composition

Carbon: 0.15-0.35%

A sufficient amount of carbon is required for strength and stabilizing the retained austenite, the latter offering the TRIP effect. In view thereof the amount of carbon is higher than 0.15%, preferably higher than 0.17%, to ensure the required strength and elongation. Increasing the carbon content results in an increase of the steel strength, the amount of retained austenite and the carbon content in the retained austenite. However, weldability of the steel is significantly reduced as the carbon content is higher than 0.25%. For applications that require welding, the carbon content is preferably 0.15-0.25%, more preferably 0.17-0.23%.
Silicon: 0.50-2.00%

Silicon is a compulsory element in the steel composition according to the invention to obtain the microstructure to be described. Its main function is to prevent carbon from precipitating in the form of iron carbides (most commonly cementite) and to suppress decomposition of residual austenite. Silicon contributes to the strength property and to an appropriate transformation behaviour. Additionally silicon contributes to improving the ductility, work hardenability and stretch flange formability through restraining austenite grain growth during annealing. A minimum of 0.50% Si is needed to sufficiently suppress the formation of carbides. However, a high silicon content results in formation of silicon oxides on the strip surface, which deteriorate the surface quality, coatability and workability. In addition, the Ac3 temperature of the steel composition increases as the silicon content is increased. This may affect the possibility of producing the steel strip using existing production lines in view of the maximum top temperature that can be achieved in the annealing section. In view thereof the silicon content is 2.00% or less. Preferably, Si is in the range of 0.80-1.80% in view of wettability in combination with suppression of carbide formation and promotion of austenite stabilisation. More preferably, Si is 1.00-1.60%.
Aluminium: 0.01-1.50%

The primary function of aluminium is to deoxidize the liquid steel before casting. For deoxidation of the liquid steel 0.01% of Al or more is needed. Furthermore, aluminium has a function similar to silicon to prevent the formation of carbides and to stabilize the retained austenite. Al is deemed to be less effective compared to Si. It has no significant effect on strengthening. Small amounts of Al can be used to partially replace Si and to adjust the transformation temperatures and the critical cooling rates to obtain acicular ferrite (AF) and to accelerate the bainitic transformation kinetics. Al is added for these purposes. Therefore, the Al content is preferably more than 0.03%. High levels of Al can increase the ferrite to austenite transformation point to levels that are not compatible with current facilities, so that it is difficult to obtain a microstructure wherein the main phase is a low-temperature transformation product. The risk of cracking during casting increases as the Al content is increased. In view thereof, the upper limit is 1.50%, preferably 1.00%, more preferably 0.70%.

Regarding the relation between the proportions of Si and Al the composition meets the condition Si+Al≥0.60, preferably Si+Al≥1.00. Advantageously the content of Al is less than 0.5 times the Si content.
Manganese: 1.50-3.00%

Manganese is required to obtain the microstructure in the steel strip according to the invention in view of hardenability and stabilisation of the retained austenite. Mn also has an effect on the formation of pro-eutectoid ferrite at higher temperatures and the bainitic ferrite transformation kinetics. A certain amount of Si and/or Al is necessary to suppress the carbide formation in the bainitic ferrite. The Ac3 temperature increases as the content of Si and Al is increased. Mn is also adjusted to balance the elevated phase transformation point Ac3 as a result of the presence of Si and Al. If the Mn content is 1.50% or less, the microstructure to be described is difficult to obtain. Therefore, Mn needs to be added at 1.50% or more. However, if Mn is present in an excessive amount, macro-segregation is likely to occur, which results in unfavourable band formation in steels. Furthermore excessive amounts of Mn lead to slow bainitic transformation kinetics, which results in a too large amount of fresh martensite, and as a consequence the stretch flange formability is also deteriorated. Therefore, the Mn content is 3.00% or less, preferably 2.80% or less, and more preferably 1.80≤Mn≤2.60%.
Phosphor: <0.050%

Phosphor is an impurity in steel. It segregates at the grain boundaries and decreases the workability. Its content is less than 0.050%, preferably less than 0.020%.
Sulphur: <0.020%

Sulphur is also an impurity in the steel. S forms sulphide inclusions such as MnS that initiates cracks and deteriorates the stretch flange formability of the steel. The S content is preferably as low as possible, for example below 0.020%, preferably below 0.010% and more preferably less than 0.005%.
Nitrogen: <0.0080%

Nitrogen is another inevitable impurity in steel. It precipitates as nitrides with micro alloying elements and is present in solid solution to contribute to strengthening. Excess nitrides deteriorate elongation, stretch flangeability and bendability. Therefore, advantageously the nitrogen content is 0.0080% or less, preferably 0.0050% or less, more preferably 0.0040% or less.

The steel composition may comprise one or more optional elements as follows:
Copper: 0-0.20%

Copper is not needed in embodiments of the steel composition, but may be present. In some embodiments, depending on the manufacturing process, the presence of Cu may be unavoidable. Copper below 0.05% is considered a residual element. Copper as alloying element may be added up to 0.20% to facilitate the removal of high Si scales formed in the hot rolling stage of manufacturing the starting steel strip and to improve the corrosion resistance when the cold rolled steel strip is used as such without surface treatment or in case of a Zn coated strip to improve the wettability by molten zinc. Cu can promote bainitic structures, cause solid solution hardening and precipitate out of the ferrite matrix, as ε-copper, thus contributing to precipitation hardening. Cu also reduces the amount of hydrogen penetrating into the steel and thus improve the delayed fracture characteristic. However, Cu causes hot shortness if an excess amount is added. Therefore, when Cu is added, the Cu content is less than 0.20%.
Chromium 0-0.35%; Nickel 0-0.50%; Molybdenum 0-0.30%

Chromium, nickel and molybdenum are not required elements, but may be present as residual elements in the steel composition. The allowable level of Cr, Ni or Mo as a residual element is 0.05% for each. As alloying elements they improve the hardenability of the steel and facilitate the formation of bainite ferrite and at the same time, they have similar effectiveness that is useful for stabilizing retained austenite. Therefore, Cr, Ni and Mo are effective for the microstructural control. The Cr, Ni or Mo content in the steel is preferably at least 0.05% to sufficiently obtain this effect. However, when each of them is added excessively, the effect is saturated and the bainitic transformation kinetics becomes too slow to obtain the required microstructure in the production line with a limited overageing time. Therefore, the amount of Cr and Mo is limited to a maximum of 0.35% and 0.30% respectively. Ni is merely used to reduce the tendency of hot shortness when a relatively high amount of Cu is added. This effect of Ni is appreciable when the Ni content is >[Cu (%)/3]. The amount of Ni, if present, is limited to a maximum of 0.50%.

Niobium 0-0.100%; Vanadium 0-0.100%; Titanium 0-0.100%

The allowable level of niobium, vanadium and titanium as residual elements is 0.005% for each. One or more of niobium, vanadium and titanium may be added to refine the microstructure in the hot rolled intermediate product and the finished products. These elements possess a precipitation strengthening effect and may change the morphology of the bainitic ferrite. They have also a positive contribution to optimization of application depending properties like stretched edge ductility and bendability. In order to obtain these effects the lower limit for any of these elements, if present should be controlled at 0.005% or more. The effect becomes saturated when the content exceeds 0.10% for each of Nb and Ti and V. Therefore, when these elements are added, the contents thereof are controlled between 0.005% and 0.100%. Preferably, the upper limit is 0.050% or less for Nb and Ti and 0.100% of less for V, because if added excessively, carbide is precipitated too much resulting in deterioration of the workability. In addition, the sum of Ti+Nb+V preferably does not exceed 0.100% in view of workability and cost.

Boron 0-0.0030%

Boron is another optional element which, if added, is controlled between 0.0003% and 0.0030%. The allowable level of B as a residual element is 0.0003%. An addition of boron increases the quench hardenability and also helps to increase the tensile strength. To obtain these effects of B, a lower limit of 0.0003% is needed, preferably 0.0005%. However, when too much B is added, the effect is saturated. Advantageously B is controlled at 0.0025% or less, preferably 0.0020% or less.

In another preferred embodiment of the invention, Ti and/or Nb and/or V and/or Ni and/or Cu and/or Cr and/or Mo and/or B are not added as alloying elements in order to reduce the cost of the final product while still obtaining a cold rolled high strength steel strip having desired properties.

Calcium 0-0.0050%: Rare Earth Elements (REM) 0-0.0100%

Furthermore, the composition according to the invention may optionally contain one or two elements selected from Ca and a rare earth metal (REM), in an amount consistent with a treatment for MnS inclusion control. If present as a residual element, the allowable level is 0.0005%. If added as an alloying element, Ca is controlled to a value less than 0.0050% and REM is controlled to a value less than 0.0100%. Ca and/or REM combines with sulfur and oxygen, thus creating oxysulfides that do not exert a detrimental effect on ductility, as in the case of elongated manganese sulfides which would form if no Ca or REM is present. This effect is saturated when Ca content is higher than 0.0050% or the REM content is higher than 0.0100%. Preferably the amount of Ca, if present, is controlled to a value below 0.0030%, more preferably below 0.0020%. Preferably the amount of REM, if present, is controlled to a value below 0.0080%, more preferably below 0.0050%.

The remainder of the steel composition comprises iron and inevitable impurities.

The chemical composition of the steels according to the invention matches the capacity of conventional continuous production lines.

Microstructure

The cold rolled steel strip that has been heat treated according to the invention has a complex microstructure, comprising 20-55% of polygonal ferrite (PF), acicular ferrite (AF) and higher bainitic ferrite (HBF), wherein PF is at most 45%, as well as 20-65% of lower bainitic ferrite (LBF), 5-20% retained austenite (RA) and fresh martensite (M) in an amount of 0-20%.

In this invention, the microstructures are functionally grouped in such a way that could be observed using optical microscopy and scanning electron microscopy. The polygonal ferrite (PF) refers to the ferrite formed at intercritical annealing or during slow cooling at temperatures above Bs. The acicular ferrite (AF) refers to the ferrite formed during cooling at temperatures between Bs and Ms. The high temperature bainitic ferrite (HBF) is the bainitic ferrite formed during austempering at a temperature between Bs and Bn. The low temperature bainitic ferrite (LBF) is the bainitic ferrite formed during austempering at a temperature between Bn and Ms.

Bainitic Ferrite Structure

The bainitic ferrite (BF) is formed during heat treatment when the austempering temperature is in the temperature range between Ms and Bs. BF is present in the form of plates with an ultrafine grain size. The precipitation of carbides between the ferritic laths, which is known to be detrimental to ductility, is suppressed by alloying with Si and/or Al. The bainitic ferrite is carbide-free, in contrast with conventional bainite that contains carbides. Bainitic ferrite also differs from (pro-eutectoid) ferrite that has a low density of dislocations. The carbide free BF microstructures provide high strength due to the intermediate hard bainitic ferrite structure with a high dislocation density and a supersaturated carbon content. The bainitic ferrite structure also contributes to the desired high elongation, since it is carbide-free and the fine residual austenite grains can be present at the boundaries of lath-shaped bainitic ferrite.

In the invention the bainitic ferrite is divided into two kinds thereof: bainitic ferrite formed at a high temperature range between Bs and Bn, referred to as high bainitic ferrite (HBF) and bainitic ferrite formed at a low temperature range between Bn and Ms, referred to as low bainitic ferrite (LBF). HBF has an average aspect ratio (defined as the length of the minor axis divided by the length of the major axis) higher than 0.35, and LBF has an average aspect ratio lower than 0.35 when the cross section of the steel strip subjected to 3% Nital etching is observed by a scanning electron microscopy with EBSD analysis. The reason to make this distinction is that bainitic ferrite formed at the higher temperature range above Bn (HBF) is similar to AF in grain size and shape and it is difficult to distinguish HBF from AF using SEM. Just like AF, HBF has a larger grain size, lower dislocation density and is softer than LBF and it acts to increase the elongation of the steel. On the other hand, LBF has a higher strength than that of HBF due to finer plate size, contributing to strength of the steel strip and also enhancing the formability.

A feature of the high strength steel strip according to the present invention is that bainitic ferrite may have a composite microstructure including HBF and LBF. Therefore a high strength cold rolled steel strip with a high elongation can be obtained. To obtain a good balance of high strength and elongation, 20-65% LBF is needed. If LBF is present in a smaller amount, the steel strip has insufficient strength. However, if LBF is present in an excessively large amount, the effects of the other ferrites (PF, AF and HBF) and retained austenite regarding elongation may be compromised. Therefore LBF is in the range of 20-65%, preferably 30-60%.

The formation of the HBF in the current invention is due to the heating of the strip through the latent heat produced by bainitic transformation or due to heating by applying a hot dip galvanization process. The formation of HBF, if any, in the present invention allows to accelerate the bainitic transformation kinetics if necessary, such that the bainitic transformation can be completed in the limited time span in the overageing section in an existing production line. Depending on the amount of PF and AF resulting from the soaking and cooling stages, the amount of HBF is controlled, such that the total amount of PF, AF and HBF is 20-55%, preferably 25-50%. As described above, HBF has a similar function to that of PF and AF. If sufficient amounts of PF and AF have been formed in the soaking and cooling sections, and for the purpose to obtain steel strip with a higher strength, the amount of HBF should be minimized to 0%. In the case that the amount of PF and AF is not sufficient, the amount of HBF can be increased. However, the amount of HBF should be controlled so that the total amount of PF, AF and HBF is 20-55%, preferably 25-50%.

Polygonal Ferrite and Acicular Ferrite

Proeutectoid ferrite is softer than bainitic ferrite and functionally increase the elongation of the steel strip. On the other hand, a certain amount of proeutectoid ferrite is introduced and the characteristics of the ferrite are controlled to increase the bainitic transformation kinetics and to enhance the stability of the retained austenite and to further increase the elongation. Two types of proeutectoid ferrite can be produced using the invention during annealing depending on the formation temperature. The ferrite phase formed when austenitizing at an intercritical temperature or formed during cooling at a high temperature above the Bs temperature in the slow cooling section is polygonal or blocky, called polygonal ferrite (PF). This type of ferrite has proven to increase the elongation but to decrease the yield strength and formability in the presence of bainitic or martensitic phases. Ferrite formed at lower temperatures in the fast cooling section in a temperature between Bs and Ms has a near acicular shape and a smaller grain size than that of PF, and is referred to as acicular ferrite (AF). It is similar to HBF in morphology but has a relatively lower amount of dislocations. The presence of AF can increase the elongation without sacrificing strength and formability.

As PF, AF and HBF have a similar function to tensile properties in the steel according to the invention, three types of these ferritic microstructures can be present, or one or two of them is/are present. For the purpose of ensuring high elongation, the volume fraction of the PF, AF and HBF is 20% or higher, preferably 25% or higher. In any case, the total amount of PF, AF and HBF should be controlled to be less than 55%, preferably less than 50%. If the content of these ferritic microstructures is too high and exceeds 55%, the final microstructure will not contain enough lower bainitic ferrite, and thus strength will be reduced.

When PF is present in steel, the grain size, the morphology and the distribution of the PF should be controlled. The steel strip can have a further higher elongation by having a smaller grain size of PF and having a dispersed distribution of PF. In accordance with this invention, when observed with SEM or an optical microscope, the PF structure is equixially embedded among BF structures and dispersed as smaller grains uniformly, while the morphological structure of PF in a conventional TRIP steel strip elongates along a rolling direction. This morphological structure is considered allowing to evenly distribute stress during processing and allowing maximum use of the TRIP effect of the retained austenite. To obtain this morphological structure, the amount of PF formed during soaking should be 45% or less, preferably 10-40%. This embodiment is particularly suitable for steel compositions containing relatively high amounts of Mn, Al and Si, in which the recrystallization kinetics of the ferrite is slower. The PF is a partially recrystallized microstructure, which has a higher hardness than the recrystallized ferrite. The presence of PF having a partially recrystallized microstructure is beneficial for local ductility. Advantageously the grain size of PF in the present invention is 10 μm or less, preferably 8 μm or less, more preferably 5 μm or less.

In an embodiment of the invention, it is preferable that the amount of PF is 0%. In this case, the total amount of AF and HBF is controlled such that AF+HBF is in a range of 20-55%, preferably 25-50%.

Residual Austenite

The residual austenite (also known as retained austenite) refers to a region that shows a FCC phase (face-centred cubic lattice) in the final microstructure. Retained austenite enhances ductility partly through the TRIP effect, which manifests itself in an increase in uniform elongation. The volume fraction of residual austenite is 5% or higher, preferably 7% or higher to exhibit the TRIP effect. Below 5% the desired level of ductility and uniform elongation will not be achieved. The upper limit is mainly determined by the composition and processing parameters in a production line. For a given composition, the carbon content in the retained austenite becomes too low if the amount of the retained austenite is too high. Then the retained austenite is insufficiently stable and the local ductility (stretch flange formability) might be reduced to an unacceptable level. Therefore, the upper limit of the volume fraction of retained austenite is 20%, preferably 15%.

The concentration of carbon in the residual austenite has an impact on the TRIP characteristics. The retained austenite is effective in improving the elongation property, in particular when the carbon concentration in the retained austenite is 0.90% or higher. If the carbon content is too low, the retained austenite is not stable enough to produce the TRIP effect. Therefore, advantageously the carbon content in the retained austenite is 0.90% or higher, preferably 0.95% or higher. While the concentration of carbon in the retained austenite is preferably as high as possible, an upper limit of about 1.6% is generally imposed by practical processing conditions. The carbon content and the stability of the retained austenite can be adjusted by controlling the amount of ferrites.

Martensite

Martensite is freshly formed in the final cooling section after austempering. It suppresses yield point elongation and increases the work hardening coefficient (n-value), which is desirable for achieving stable, neck-free deformation and strain uniformity in the final pressed part. Even at 1% of fresh martensite in the final steel strip a tensile response and thus press behaviour can be achieved comparable to conventional dual phase steels. However, the presence of the fresh martensite will impair formability due to the crack formation along the martensite and LBF/HBF interfaces. Therefore, the amount of the fresh martensite should be controlled to 20% or less, preferably 15% or less.

Carbides

Carbides can be present as fine precipitates, which are formed during austempering when the overageing temperature is too high or the overageing time is too long or in the form of pearlite formed during cooling when the cooling rate is too slow. According to the invention, the microstructure of the invented steel is pearlite-free and carbide-free. Pearlite-free means that the amount of the layered microstructure including cementite and ferrite is less than 5%. Carbide-free means that the amount carbide is below the detection limit of standard x-ray measurements.

Characterization of Microstructures

The microstructural constituents classified in steel according to the invention as described above can be quantitatively determined by techniques described hereafter. The volume fraction of the constituents is measured by equating the volume fraction to the area fraction and measuring the area fraction from a polished surface using a commercially available image-processing program or a suitable other technique.

PF, fresh M, RA and pearlite can be distinguished using optical microscopy (OM) and/or scanning electron microscopy (SEM). When a sample etched with 10% aqueous sodium metabisulfite (abbreviated SMB) is characterised under OM, pearlite is observed as dark areas, PF is observed as tinted grey areas and fresh martensite is observed as light brown areas. When a sample etched with 3% Nital solution is characterised with SEM, PF is observed as grains with a smoother surface that do not include the retained austenite, pearlite is observed as layered microstructure including both cementite and ferrite. The rest microstructure is observed as grey areas, featured by plate or lath like ferritic substructures, in which the RA is dispersed in the grains as white or pale grey areas and no carbides can be identified. This microstructural group is referred to as the bainitic ferrite like microstructure. It may include a mixture of HBF, LBF, AF and another microstructure called partitioned martensite (PM). PM is produced when the austempering temperature is below the Ms point of the steel. Some martensite forms during fast cooling and then carbon partition occurs between martensite and the retained austenite during austempering. PM is present as a similar morphology to LBF and may coexist with LBF. The AF, HBF, LBF and PM in the bainitic ferrite like microstructure cannot be clearly distinguished by using OM and SEM because their morphologies are similar.

In this invention, the bainitic ferrite like microstructure is further separated into two distinct groups by means of Electron Back Scatter Diffraction (EBSD). The first group consists of PM and LBF and the second group consists of AF and HBF. From measured EBSD data, the retained austenite can be first distinguished from the other microstructures by creating Fe($\gamma$) partition from Fe($\alpha$). The fresh martensite (M) is then separated from the bainitic ferrite like microstructure by splitting the Fe($\alpha$) into a partition with a high average image quality (IQ) and a partition with a low average IQ. The low IQ partition is classified as martensite and the high IQ partition is classified as the bainitic ferrite like microstructure. The method of distinguishing the types of two groups is described below with reference to FIG. 1. In the bainitic ferrite (high IQ partition), regions having a difference in orientation not lower than 15° in the inclination angle between adjacent structures are identified. A region is regarded as having the same crystal orientation and is defined as a bainitic plate in the present invention. For the bainitic plates thus detected, the diameter of a circle that has the same area as a bainitic plate is determined. The diameter of the equivalent circle of the bainitic plate is determined by using the photograph of EBSD analysis with magnification factor of 3000. By fitting an ellipse to a bainitic plate, the aspect ratio (defined as the length of the minor axis divided by the length of the major axis) is also determined. Similarly, diameters of the equivalent circles of all bainitic plates and aspect ratios of the equivalent ellipses of all bainitic plates in the measured area (about 100 by 100 μm) are measured and the average values are defined as the mean grain size of bainitic plates and the mean aspect ratio of the bainitic plates in the present invention.

The inventors have systematically studied the effect of the austempering temperature on the microstructure of the bainitic ferrite. The austempering temperature ranges from Ms-200 to Bs. It has been found that the mean size and the mean aspect ratio of the bainitic plates increase as the austempering temperature is increased. Especially, the aspect ratio of the bainitic plates is found to have a sharp change between the samples austempered below 440° C., which is below Bn and above 460° C., which is above Bn of the steel composition used in the method according to the invention. Thus, the critical mean value of the aspect ratio of 0.35 is defined to split the two groups of bainitic ferrite like microstructure. The group consisting of LBF and PM has an aspect ratio of 0.35 or less and the group consisting of HBF and AF has an aspect ratio of more than 0.35.

Figure 2:
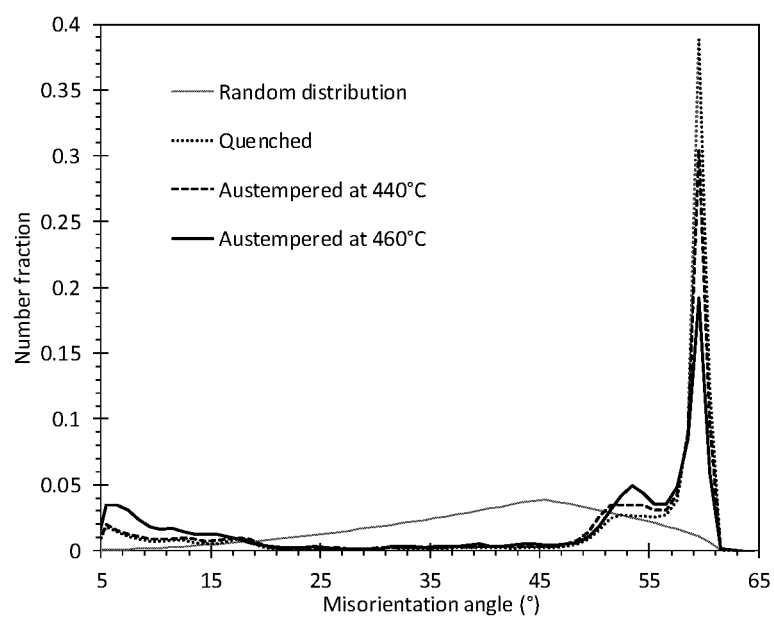
FIG. 2 is a histogram of misorientation angle of a low temperature bainitic ferrite and a high temperature bainitic ferrite.

In addition to the difference in the morphology and the size of the bainitic plates, the misorientation relationships among the intricate crystallographic plates between the HBF, AF group and the LBF, PM group are also different. The misorientation angle distribution in the steel according to the invention is shown in FIG. 2. The peak at 60° is consistent with the misorientations between neighbouring grains, bearing Kurdjumov-Sachs (KS/KS) relationship, which is caused by the axe-angle relationship 60°<111> and 60°<110> and corresponds to martensite. The peak at 53°-54° is due to the misorientations between grains obtained by phase transformations according to the relationship of Nishiyama-Wassermann and Kurdjumov-Sachs (NW/KS). According to prior art (see A.-F. Gourgues, H. M. Flower, and T. C. Lindley, Materials Science and Technology, January 2000, Vol. 16, p. 26-40), acicular ferrite and upper bainite grow with Nishiyama-Wassermann relationships with the parent austenite phase, whereas lower bainite and martensite consist of highly intricate packets having Kurdjumov-Sachs relationships with the parent phase. In analogy with these results, it is assumed that the peak at 53-54° corresponds to the formation of HBF and AF, and the peak at 60° corresponds to the formation of LBF and PM. The peak at 53-54° becomes more distinguishable and the height of the peak increases but the height of the peak at 60° decreases as the austempering temperature is increased. In the present invention, the relative amounts of the HBF, AF group and the LBF, PM group can be determined by the ratio of the height of the two peaks.

As some of the retained austenite is dispersed as film in very small size between the bainitic plates and cannot be detected by EBSD, the fraction of the retained austenite determined by EBSD is always lower than the actual value. Therefore, an intensity measuring method based on X-ray diffraction (XRD) as a conventional technique of measuring content of retained austenite can be employed. The volume fraction of retained austenite is determined at ¼ thickness of the steel strip. The amount of cementite is also measured from this XRD analysis. A sample prepared from the steel strip is mechanically and chemically polished and is then analyzed by measuring the integral intensity of each of the (200) plane, (220) plane, and (311) plane of fcc iron and that of the (200) plane, (211) plane, and (220) plane of bcc iron with an X-ray diffractometer using Co-K$\alpha$. The amount of retained austenite (RA) and the lattice parameter in the retained austenite were determined using Rietveld analysis. The C content in the retained austenite is calculated using the formula:

$$C\ (wt.\ \%) = (a[\mathring{A}] - 3.572 - 0.0012 Mn\ \% + 0.00157 Si\ \% - 0.0056 Al\ \%)/0.033$$

where a is the lattice parameter of the retained austenite in angstrom.

Mechanical Properties

The cold rolled steel strips with the above microstructure and composition and heat treated according to the invention have such properties:

Yield strength (YS) is at least 500 MPa; and/or
Tensile strength (TS) is at least 850 MPa; and/or
Total elongation (TE) is at least 14%.

Preferably the cold rolled and heat treated strip possesses all these properties.

Method Steps

According to the method of the invention a cold rolled steel strip having the composition as explained above is heat treated to obtain the microstructure and properties. The cold rolled steel strip obtained through cold rolling is subjected to a thermal treatment as in a continuous annealing line. A typical design of the process is diagrammatically shown in FIG. 3. The cold rolled steel strip is heated above the temperature (Ac3−60), e.g. using a heating rate of at least 0.5° C./s, preferably to the temperature range of (Ac3−60)-(Ac3+20), typically to a pre-determined austenization temperature T2, and held for a period of time t2 within this temperature range (step a), and then cooled, typically using a two-step cooling at controlled cooling rates, to a temperature T4 in the range of Ms-Bn (step b). After that, the steel strip is heat treated in the range of T4 to Bs for austempering for a time t5 (step c), preferably at a temperature T5 in the range of T4 to Bn. Optionally, the steel strip is then heated to a temperature T6 in the range of Bn to Bs for a period of time t6, which may be a hot dip galvanizing treatment. Finally, the steel strip is cooled down to room temperature (step d). The process parameters and functions in each step will be described hereinafter.

In a first step thereof the cold rolled steel is soaked above (Ac3−60), such as within a temperature range of (Ac3−60)-(Ac3+20) during a soaking time t2 of 1-150 seconds in order to achieve an at least partially austenitic microstructure. Annealing at a temperature above (Ac3−60) is necessary because the steel strip that is heat treated according to the invention, needs to have the required amounts of the low temperature transformed phases such as bainitic ferrite and retained austenite which are transformed from high temperature austenite, as well as a predetermined amount of ferrite. If T2 is higher than (Ac3+20), austenite grains will grow, which influences the size and distribution of the retained austenite and also slows down the bainitic transformation kinetics later in the overaging process. An excess amount of fresh martensite formed during final cooling may form as a result of this incomplete bainitic transformation, which leads to a higher strength but a low ductility and formability. Moreover, a uniform austenite structure with larger grain sizes may suppress the formation of PF and AF in the following cooling section so that an insufficient amount of ferrite is obtained within the current cooling schedule in the available production line, and may cause the steel strip to have an insufficient elongation. It has been observed that the uniformity of the austenite has a large effect on the formation of PF and AF in the cooling section. If T2 is lower than (Ac3−60), PF might be formed in an excessive amount more than 45%, thus the steel strip may obtain insufficient strength. On the other hand, the amount of austenite formed may be not enough for the formation of the LBF and retained austenite. Accordingly, the annealing temperature needs to be higher than (Ac3−60), but advantageously not to exceed (Ac3+20), preferably in the range of (Ac3−50) to (Ac3+10). If t2 is longer than 150 seconds, austenite and ferrite grain sizes become larger, which leads to a lower elongation. If the annealing time t2 is shorter than 1 s, reverse transformation to austenite may not proceed sufficiently and/or carbides in the steel strip may not have been dissolved sufficiently. Therefore, the annealing time t2 is 1 second to 150 seconds, such as 10 seconds to 120 seconds, preferably 1-100 seconds.

In a subsequent cooling step the at least partially austenitic strip is cooled to a temperature T4 in the range of Bn-Ms. The purpose of this cooling is to regulate the amounts of ferrites and bainitic ferrite and to prevent the formation of pearlite. Typically this means that the cooling rate during cooling is high enough to avoid pearlite formation.

In one embodiment of the invention, the steel strip thus treated is directly cooled to the temperature T4 at a cooling rate V4 of at least 15° C./s to prevent the formation of pearlite. If the cooling rate is too low, ferrite may form in an excess amount or even pearlite may form. Preferably, V4 is higher than 20° C./s. The upper limit of the cooling rate is not particularly restricted, unless variation in temperature occurs in the steel strip when the cooling is stopped. The cooling rate is preferably 100° C./s or lower in standard facilities to reduce the temperature inhomogeneity in the steel strip. A significantly large variation in microstructure both in the longitudinal direction and the strip widthwise direction may occur, when the average cooling rate exceeds 80° C./s in most of available facilities. Accordingly, a suitable cooling rate V4 is in the range of 15 to 80° C./s, preferably 20 to 60° C./s.

In other embodiments of the invention, this cooling can be realized by a two-step cooling in order to regulate the amount of ferrite and to homogenize the strip temperature. This fits most of the continuous annealing lines or hot dip galvanizing lines which include two connected cooling sections as currently in use. The steel strip is first cooled to a temperature T3 in the range of 800-500° C. (referred to as slow cooling section), preferably in the range of 750-550° C., typically at a cooling rate of V3 of at least 1° C./s, such as 2-15° C./s, preferably 3-10° C./s. Thereafter, the steel strip is cooled further down to the temperature T4 (referred to as fast cooling section), typically at a cooling rate V4 of at least 15° C./s, such as 15-80° C./s, preferably 20-60° C./s. As the length at each section in a continuous annealing line is fixed, the cooling rates V3 and V4 for a given line speed can be controlled by adjusting the T3 temperature. The higher the T3 is, the lower the V3 is and the higher the V4 is. During this cooling some PF may form in the slow cooling section, and some AF may form in the fast cooling section. For a fixed line speed, the amount of PF formed in the slow cooling section mainly depends on T3 and the amount of AF mainly depends on V4. Therefore T3 is selected in a suitable range to adjust the amount of ferrite and to prevent the formation of pearlite. If T3 is too low, e.g. lower than 500° C., PF may form in an excess amount in the slow cooling section and AF may also form in an excess amount in the fast cooling section, or even pearlite may form if the resulting V4 is lower than 15° C./s. If T3 is too high, e.g. higher than 800° C., PF may form insufficiently and less AF is formed if the resulting V4 is too high. Accordingly, T3 should be in the range of 800 to 500° C., preferably in the range of 750 to 550° C./s.

As mentioned above PF can be obtained in the soaking step a) and in the slow cooling section in step b), while AF is obtained in the fast cooling section in step b) in a conventionally designed annealing line or galvanizing line. The soaking temperature T2 and the intermediate temperature T3 between the slow cooling section and the fast cooling section can be used to regulate the amount of ferrite. If a higher T2 is used, less amount of PF is produced during soaking a lower T3 can then be selected to obtain more PF in the slow cooling section and more AF in the fast cooling section. If a lower T2 is used, a sufficient amount of PF is produced during soaking, then a higher T3 is selected to limit the amount of PF formed in the slow cooling section and the amount of AF formed in the fast cooling section.

The cooling stop temperature T4 is between Bn and Ms to start the bainitic transformation. If T4 is too high, too much HBF may be obtained during following austempering, and the strength of the steel strip could be insufficient. If T4 is too low and in the absence of active heating the latent heat produced by bainitic transformation is not enough to heat the steel strip to a temperature high enough for fast bainitic transformation kinetics. Preferably, T4 is in the range between Bn and Ms+50° C.

In the subsequent heat treatment step c) the cooled strip is heat treated in the range between the temperature T4 and Bs, and preferably between T4 and Bn for a time t5 in the range of 30-300 seconds, typically by heating to and heat treating at a temperature T5 in this range, during which the austenite transforms into lower bainitic ferrite (LBF). If T5 is too low, the bainitic transformation is too slow, the bainitic transformation is insufficient during overageing and fresh martensite may form during cooling after overageing in excess amounts, which increases the strength but cannot provide the required elongation. On the other hand, carbon partition may be insufficient to stabilize the retained austenite. If T5 is too high, there is a risk that too much HBF is obtained in the overageing section, which cannot provide the required strength. The most preferred range for step c) is Bn-50 to Bn in order to achieve the fast bainitic transformation kinetics and to obtain LBF. If the heat treatment time t5 is less than 30 s, the bainitic transformation is incomplete and not enough LBF is formed. Again carbon partition is insufficient. If t5 is more than 300 s, there is a risk that carbides start to form and therefore decrease the carbon content in the retained austenite. The maximum time for t5 is limited by inter alia the total available time at a given speed of the production line. Preferably, t5 is in the range of 40 to 120 seconds.

Subsequently the thus heat treated strip is cooled following the production line capacity to ambient temperature during which some fresh martensite may be formed. The steel strip is then cooled down to below 300° C. at a cooling rate V7 of at least 1° C./s, preferably at least 5° C./s, after which it is further cooled down to ambient temperature. Cooling down to ambient temperature may be forced cooling or uncontrolled natural cooling. In a practical embodiment the heat treated steel strip is cooled to a temperature T7 in the range of (Ms-50)-Mf at a cooling rate V7 in the range of 5.0-10.0° C./s. Further cooling from T7 to ambient temperature is advantageously performed at a cooling rate V8 of 5.0-20.0° C./s, more preferably 6.0-15.0° C./s.

In an embodiment of the invention, the heat treatment step c) is preferably carried out at least partially by latent heat from the bainitic transformation. During this heat treatment step c) the lower bainite transformation produces latent heat. As the latent heat may be incompletely dissipated in the production line, the temperature of the steel strip automatically increases by the accumulated latent heat. Therefore the temperature of the steel strip being heat treated can gradually increase due to latent heat of the bainitic transformation that occurs. That is, the temperature T5 increases during the course of the heat treatment, in particular at longer times t5. The upper temperature of T5 is not particularly limited, if the steel strip reaches temperatures higher than Bn, high temperature bainitic ferrite will be formed.

In an embodiment the soaking step is performed within an intercritical annealing temperature range of (Ac3-50)-(Ac3+10), preferably for a soaking time t2 of 1-100 seconds in order to ensure that a partially austenitic cold rolled strip having a fine grain size is obtained. The fraction of PF formed at the soaking temperature is advantageously less than 40%.

Advantageously the heating step, prior to the soaking step, is performed in two substeps, comprising heating a cold rolled strip to a temperature T1 in the range of 680-740° C., preferably in the range of 700-720° C., at a heating rate V1 of 10.0-30.0° C./s, preferably 15.0-25.0° C./s; and further heating the cold rolled strip from the temperature T1 to the soaking temperature range at a heating rate V2 of 0.5-4.0° C./s, preferably 1.0-3.0° C./s. During the slow heating from T1 to the soaking temperature T2, recovery and recrystallization occur in the ferrite, as well as dissolution of carbides and ferrite during austenite transformation. T1 and V2 affect the progress of these processes, which affect the austenite grains size and the homogeneity of the distribution of the alloying elements in the austenite phase. Advantageously the soaking time t2 is controlled, depending on the heating rate V2, to ensure dissolution of all carbides and avoidance of a coarse austenitic grain size.

In an embodiment the method according to the invention comprises a further heat treatment step between the heat treatment step c) and cooling step d), wherein the steel strip resulting from step c) is subjected to an additional heat treatment in the range of Bs-Bn, preferably (Bs-50)-Bn, typically at a fixed temperature T6. The additional treatment time t6 is advantageously 5-30 seconds, preferably 10-20 seconds. This additional heat treatment increases the bainitic ferrite by formation of high temperature bainitic ferrite from remaining austenite to complete the bainitic transformation and therefore further reduces the amount of martensite formed in the following cooling section, enabling improvement of the strength and ductility properties. Carbon also further partitions into the retained austenite making it more stable. When this additional heat treatment is applied in a given overageing section and thus a given total time span therein, the time t5 is further reduced to meet the available time span, e.g. the sum of t5+t6 is in the range of 30-300 s.

In a preferred embodiment this additional heat treatment comprises an integrated hot dip galvanizing treatment, wherein the steel strip resulting from step c) is coated with a Zn or Zn alloy based coating.

The steel strip that has been heat treated according to the invention can be provided with a coating, advantageously a zinc or zinc alloy based coating. Advantageously the zinc based coating is a galvanized or galvannealed coating. The Zn based coating may comprise a Zn alloy containing Al as an alloying element. A preferred zinc bath composition contains 0.10-0.35% Al, the remainder being zinc and unavoidable impurities. Another preferred Zn bath comprising Mg and Al as main alloying elements, has the composition: 0.5-3.8% Al, 0.5-3.0% Mg, optionally at most 0.2% of one or more additional elements; the balance being zinc and unavoidable impurities. Examples of the additional elements include Pb, Sb, Ti, Ca, Mn, Sn, La, Ce, Cr, Ni, Zr and Bi.

The coating such as a protective coating of Zn or Zn alloy may be applied in a separate step. Preferably a hot dip galvanizing step is integrated in the method according to the invention as explained above.

Optionally a temper rolling treatment may be performed with the annealed and zinc coated strip according to the invention in order to fine tune the tensile properties and to modify the surface appearance and roughness depending on the specific requirements resulting from the intended use.

The cold rolled steel strip as such is typically manufactured according to the following general process. A steel composition as described above is prepared and cast into a slab. The cast slab is processed using hot rolling after reheating at a temperature in the range of 1100-1300° C. Typically hot rolling of the slab is performed in 5 to 7 stands to final dimensions that are suitable for further cold rolling. Typically finish rolling is performed in the fully austenitic condition above 800° C., advantageously 850° C. or higher. The strip thus obtained from the hot rolling steps may be coiled, e.g. at a coiling temperature of typically 700° C. or lower. The hot rolled strip is pickled and cold rolled to obtain a cold rolled steel strip with proper gauges. Preferably the cold rolling reduction is in the range of typically 30 to 80%. In order to reduce the rolling force during cold rolling, the coiled strip or half cold rolled strip may be subjected to hot batch annealing. The batch annealing temperature should be in the range of 500-700° C. Thin slab casting, strip casting or the like can also be applied. In this case it is acceptable for the manufacturing method to skip at least a part of the hot rolling process.

The invention also relates to an heat treated cold rolled steel strip having a composition and microstructure as outlined above.

The invention also resides in an article, such as a structural, engineering or automotive component, that is produced from the cold rolled and heat treated strip according to the invention.

EXAMPLES

Steels having compositions as shown in Table 1 were cast into 25 kg ingots of 200 mm×110 mm×110 mm in dimensions using vacuum induction. The following process schedule was used to manufacture cold rolled strips of 1 mm thickness:

Reheating of the ingots at 1225° C. for 2 hours;
Rough rolling of the ingots from 140 mm to 35 mm;
Reheating of the rough-rolled ingots at 1200° C. for 30 min;
Hot rolling from 35 mm to 4 mm in 6 passes;
Run-out-table cooling: cool from finish rolling temperature (FRT) about 850 to 900° C. to 600° C. at a rate of 40° C./s;
Furnace cooling: strips transferred to a preheated furnace at 600° C. and then cooled to room temperature to simulate the cooling process;
Pickling: The hot rolled strips were then pickled in HCl at 85° C. to remove the oxide layers;
Cold rolling: The hot rolled strips were cold rolled to 1 mm strips;

Heat treating according to the invention: Cold rolled sheets with suitable size were used to simulate the annealing process by using a continuous annealing simulator (CASIM).

Samples for microstructure observations, tensile tests and hole expansion tests were machined from the thus treated sheets.

Dilatometry was done on the cold rolled samples of 10 mm×5 mm×1 mm dimensions (length along the rolling direction). Dilatation tests were conducted on a Bahr dilatometer type DIL 805. All measurements were carried out in accordance with SEP 1680. The critical phase transformation points Ac3, Ms and Mf were determined from the quenched dilatometry curves. Bs and Bn were predicted using available software JmatPro 10. The phase fractions during annealing for different process parameters were determined from dilatation curves simulating the annealing cycles.

The microstructure was determined by optical microscopy (OM) and scanning electron microscopy (SEM) using a commercially available image-processing program. The microstructures were observed at ¼ thickness in the cross section of rolling and normal directions of a steel strip. The Scanning Electron Microscope (SEM) used for the EBSD measurements is a Zeiss Ultra 55 machine equipped with a Field Emission Gun (FEG-SEM) and an EDAX PEGASUS XM 4 HIKARI EBSD system. The EBSD scans were captured using the TexSEM Laboratories (TSL) software OIM (Orientation Imaging Microscopy) Data Collection. The EBSD scans were evaluated with TSL OIM Analysis software. The EBSD scan area was in all cases 100×100 μm, with a step size of 0.1 μm, and a scan rate of approximately 80 frames per second.

The retained austenite was determined by XRD according to DIN EN 13925 on a D8 Discover GADDS (Bruker AXS) with Co-Kα radiation. Quantitative determination of phase proportions was performed by Rietveld analysis.

Tensile tests—J155 test pieces (gauge length=50 mm; width=25 mm) were machined from the annealed strips such that the tensile direction was parallel to the rolling direction. Room temperature tensile tests were performed in a Schenk TREBEL testing machine following NEN-EN10002-1:2001 standard to determine tensile properties (yield strength YS (MPa), ultimate tensile strength UTS (MPa), total elongation TE (%)). For each condition, three tensile tests were performed and the average values of mechanical properties are reported. The process parameters are presented in Table 2 using the indications in FIG. 3. In CASIM, the latent heat produced during bainitic transformation is compensated by the active cooling system. The temperature variation by latent heat in the overageing section is simulated by the temperatures T4, T5 and T6. In those cases that T4 equals T5, t4 is 0. In the cases that T4 is lower than T5, t4 is 1 s and subsequent heating to T5 occurs at a heating rate of 5-20° C./s. The heating rate from T5 to T6 is 5-10° C./s. The resulting microstructures and tensile properties are given in Table 3. All the steel compositions are inventive except A79 and reach the requirements for microstructure and tensile properties under varying processing parameters specified. The steel A79 could not achieve the required elongation although the tensile strength is sufficient high (examples 26 and 27). The reason is that A79 contains 0.5% Cr, which slows down the bainitic transformation kinetics significantly so that the bainitic transformation and the C partition between BF and retained austenite could not sufficiently proceed. Consequently the amount of martensite is increased but the amount of retained austenite and the C content in the retained austenite is decreased, which leads to a reduced TRIP effect.

TABLE 1

Compositions (in wt %) and the critical phase transformation points (in ° C.) of the steels

| Alloy code | C | Mn | Si | Al | Cr | Cu | Nb | Mo | S | P | Ti | V | N | Ac3 | Ms | Mf | Bs | Note |
|---|---|---|---|---|---|---|---|---|---|---|---|---|---|---|---|---|---|---|
| A16 | 0.210 | 2.210 | 1.170 | 0.016 | 0.010 | 0.005 | 0.002 | 0.002 | 0.002 | 0.003 | 0.002 | 0.002 | 0.004 | 855 | 372 | 178 | 560 | inv. |
| A50 | 0.207 | 2.290 | 1.005 | 0.037 | 0.010 | 0.005 | 0.001 | 0.002 | 0.003 | 0.002 | 0.002 | 0.002 | 0.002 | 846 | 385 | 178 | 560 | inv. |
| A51 | 0.177 | 2.303 | 1.003 | 0.037 | 0.010 | 0.002 | 0.001 | 0.002 | 0.004 | 0.001 | 0.002 | 0.002 | 0.004 | 858 | 398 | 185 | 567 | inv. |
| A53 | 0.176 | 2.013 | 1.003 | 0.040 | 0.010 | 0.005 | 0.001 | 0.002 | 0.005 | 0.003 | 0.001 | 0.002 | 0.003 | 862 | 410 | 198 | 593 | inv. |
| A54 | 0.206 | 2.279 | 1.468 | 0.038 | 0.010 | 0.005 | 0.001 | 0.002 | 0.006 | 0.004 | 0.001 | 0.002 | 0.005 | 871 | 381 | 175 | 551 | inv. |
| A72 | 0.207 | 1.787 | 1.446 | 0.039 | 0.010 | 0.001 | 0.001 | 0.002 | 0.003 | 0.003 | 0.001 | 0.001 | 0.003 | 879 | 408 | 205 | 593 | inv. |
| A73 | 0.207 | 2.470 | 1.525 | 0.036 | 0.010 | 0.001 | 0.001 | 0.003 | 0.005 | 0.001 | 0.001 | 0.002 | 0.005 | 865 | 365 | 162 | 532 | inv. |
| A74 | 0.207 | 1.774 | 1.010 | 0.036 | 0.310 | 0.001 | 0.001 | 0.002 | 0.005 | 0.005 | 0.001 | 0.002 | 0.004 | 854 | 392 | 195 | 584 | inv. |
| A75 | 0.209 | 2.265 | 1.520 | 0.037 | 0.010 | 0.107 | 0.001 | 0.002 | 0.002 | 0.002 | 0.001 | 0.002 | 0.003 | 869 | 375 | 178 | 550 | inv. |
| A79 | 0.213 | 1.940 | 1.470 | 0.020 | 0.500 | 0.002 | 0.001 | 0.003 | 0.005 | 0.003 | 0.002 | 0.003 | 0.002 | 860 | 390 | 195 | 543 | comp. |
| A95 | 0.205 | 2.442 | 1.183 | 0.321 | 0.010 | 0.003 | 0.001 | 0.004 | 0.002 | 0.005 | 0.001 | 0.002 | 0.002 | 880 | 391 | 175 | 557 | inv. |
| A96 | 0.211 | 2.289 | 0.810 | 0.303 | 0.010 | 0.003 | 0.001 | 0.002 | 0.003 | 0.004 | 0.001 | 0.003 | 0.003 | 872 | 400 | 185 | 576 | inv. |
| A97 | 0.210 | 2.000 | 1.470 | 0.037 | 0.010 | 0.003 | 0.001 | 0.002 | 0.003 | 0.004 | 0.001 | 0.001 | 0.004 | 875 | 395 | 180 | 573 | inv. |
| A98 | 0.207 | 2.272 | 1.000 | 0.034 | 0.010 | 0.003 | 0.020 | 0.002 | 0.003 | 0.003 | 0.001 | 0.002 | 0.003 | 850 | 382 | 175 | 561 | inv. |
| A99 | 0.250 | 2.299 | 1.021 | 0.036 | 0.010 | 0.003 | 0.001 | 0.003 | 0.004 | 0.003 | 0.001 | 0.003 | 0.002 | 833 | 358 | 155 | 547 | inv. |

TABLE 2

Process parameters

Figure 3:
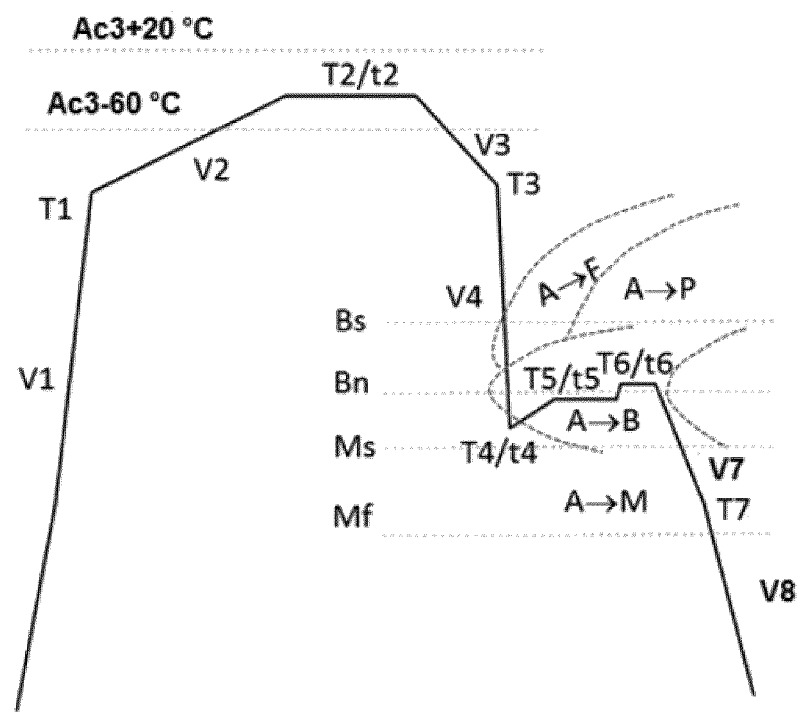
FIG. 3 is a diagram showing a generally applicable time vs temperature profile of an embodiment of the method according to the invention.

Process parameters indicated in Figure 3

| Example | Alloy code | T1 ° C. | V2 ° C./s | T2 ° C. | t2 s | V3 ° C./s | T3 ° C. | V4 s | T4 ° C. | t4 s | T5 ° C. | t5 s | T6 ° C. | t6 s | V7 ° C./s | T7 ° C. | V8 ° C./s |
|---|---|---|---|---|---|---|---|---|---|---|---|---|---|---|---|---|---|
| 1 | A16 | 720 | 1.34 | 850 | 65 | 3.7 | 700 | 41.5 | 430 | 0 | 430 | 53 | 455 | 19 | 6.3 | 300 | 11.3 |
| 2 | A16 | 720 | 1.44 | 860 | 65 | 3.9 | 700 | 46 | 420 | 0 | 455 | 53 | 455 | 19 | 6.3 | 300 | 11.3 |
| 3 | A50 | 720 | 1.28 | 860 | 73.5 | 3.5 | 700 | 37 | 440 | 0 | 440 | 60.3 | 460 | 21.5 | 5.8 | 300 | 9.3 |
| 4 | A50 | 720 | 1.44 | 860 | 65 | 3.9 | 700 | 40 | 440 | 0 | 440 | 53 | 460 | 19 | 6.5 | 300 | 11.3 |
| 5 | A50 | 720 | 1.24 | 840 | 65 | 4.4 | 660 | 34 | 440 | 0 | 440 | 53 | 460 | 19 | 6.5 | 300 | 11.3 |
| 6 | A51 | 720 | 1.1 | 860 | 86 | 3 | 700 | 30 | 440 | 0 | 440 | 70.5 | 460 | 25.1 | 5 | 300 | 7.9 |
| 7 | A51 | 720 | 1.34 | 850 | 65 | 3.7 | 700 | 40 | 440 | 0 | 440 | 53 | 460 | 19 | 6.5 | 300 | 11.3 |
| 8 | A51 | 720 | 1.34 | 850 | 65 | 3.7 | 700 | 38.5 | 450 | 0 | 450 | 53 | 460 | 19 | 6.5 | 300 | 11.3 |
| 9 | A51 | 720 | 1.34 | 850 | 65 | 4.7 | 660 | 34 | 440 | 0 | 440 | 53 | 460 | 19 | 6.5 | 300 | 11.3 |
| 10 | A53 | 720 | 1.1 | 860 | 86 | 3 | 700 | 30 | 440 | 0 | 440 | 70.5 | 460 | 25.1 | 5 | 300 | 7.9 |
| 11 | A53 | 720 | 1.28 | 860 | 73.5 | 3.5 | 700 | 37 | 440 | 0 | 440 | 60.3 | 460 | 21.5 | 5.8 | 300 | 9.3 |
| 12 | A53 | 720 | 1.44 | 860 | 65 | 3.9 | 700 | 40 | 440 | 0 | 440 | 53 | 460 | 19 | 6.5 | 300 | 11.3 |
| 13 | A54 | 720 | 1.44 | 860 | 65 | 3.9 | 700 | 40 | 440 | 0 | 440 | 53 | 460 | 19 | 6.5 | 300 | 11.3 |
| 14 | A54 | 720 | 1.17 | 870 | 86 | 3.17 | 700 | 30 | 440 | 0 | 440 | 70.5 | 460 | 25.1 | 5 | 300 | 7.9 |
| 15 | A54 | 720 | 1.55 | 870 | 65 | 4.2 | 700 | 40 | 440 | 0 | 440 | 53 | 460 | 19 | 6.5 | 300 | 11.3 |
| 16 | A54 | 720 | 1.34 | 850 | 65 | 4.7 | 660 | 34 | 440 | 0 | 440 | 53 | 460 | 19 | 6.5 | 300 | 11.3 |
| 17 | A72 | 720 | 1.65 | 880 | 65 | 4.4 | 700 | 40 | 440 | 0 | 440 | 53 | 460 | 19 | 6.5 | 300 | 11.3 |
| 18 | A73 | 720 | 1.34 | 850 | 65 | 3.7 | 700 | 40 | 440 | 0 | 440 | 53 | 460 | 19 | 6.5 | 300 | 11.3 |
| 19 | A73 | 720 | 1.3 | 850 | 65 | 6.2 | 600 | 25 | 420 | 1 | 440 | 53 | 460 | 19 | 6.5 | 300 | 11.3 |
| 20 | A74 | 720 | 1.4 | 860 | 65 | 6.4 | 660 | 34 | 440 | 0 | 440 | 53 | 460 | 19 | 6.5 | 300 | 11.3 |
| 21 | A75 | 720 | 1.65 | 880 | 65 | 8.1 | 550 | 17 | 440 | 0 | 440 | 53 | 460 | 19 | 6.5 | 300 | 11.3 |
| 22 | A75 | 700 | 1.1 | 880 | 1 | 5.7 | 650 | 32 | 440 | 0 | 440 | 53 | 460 | 19 | 6.5 | 300 | 11.3 |
| 23 | A75 | 700 | 1.1 | 880 | 1 | 8.1 | 550 | 17 | 440 | 0 | 440 | 53 | 460 | 19 | 6.5 | 300 | 11.3 |
| 24 | A75 | 720 | 1.24 | 840 | 65 | 4.7 | 650 | 32 | 440 | 0 | 440 | 53 | 460 | 19 | 6.5 | 300 | 11.3 |
| 25 | A75 | 720 | 1.1 | 830 | 65 | 3.2 | 700 | 40 | 440 | 0 | 440 | 53 | 460 | 19 | 6.5 | 300 | 11.3 |
| 26 | A79 | 720 | 1.7 | 880 | 65 | 8.1 | 550 | 16.9 | 440 | 0 | 440 | 53 | 460 | 19 | 6.5 | 300 | 11.3 |
| 27 | A79 | 720 | 1.2 | 840 | 65 | 3 | 720 | 43 | 440 | 0 | 440 | 53 | 460 | 19 | 6.5 | 300 | 11.3 |
| 28 | A95 | 720 | 1.55 | 870 | 65 | 4.2 | 700 | 40 | 440 | 0 | 440 | 53 | 460 | 19 | 6.5 | 300 | 11.3 |
| 29 | A96 | 720 | 1.44 | 860 | 65 | 4.9 | 660 | 34 | 440 | 0 | 440 | 48 | 460 | 19 | 6.5 | 300 | 11.3 |
| 30 | A96 | 720 | 1.24 | 840 | 65 | 3.5 | 700 | 40 | 440 | 0 | 440 | 53 | 460 | 19 | 6.5 | 300 | 11.3 |
| 31 | A97 | 720 | 1.55 | 870 | 65 | 4.2 | 700 | 40 | 440 | 0 | 440 | 53 | 460 | 19 | 6.5 | 300 | 11.3 |
| 32 | A97 | 720 | 1.4 | 860 | 65 | 3.4 | 720 | 43 | 440 | 0 | 440 | 53 | 460 | 19 | 6.5 | 300 | 11.3 |
| 33 | A98 | 720 | 1.44 | 860 | 65 | 3.9 | 700 | 40 | 440 | 0 | 440 | 53 | 460 | 19 | 6.5 | 300 | 11.3 |
| 34 | A98 | 720 | 1.44 | 860 | 65 | 4.9 | 660 | 34 | 440 | 0 | 440 | 48 | 460 | 19 | 6.5 | 300 | 11.3 |
| 35 | A99 | 720 | 1.24 | 840 | 65 | 3.5 | 700 | 40 | 440 | 0 | 440 | 53 | 460 | 19 | 6.5 | 300 | 11.3 |

TABLE 3

Microstructures and tensile properties

| Example | Alloy code | PF % | PF + AF + HBF % | LBF % | M % | RA % % | C in RA wt. % | YS MPa | TS MPa | UE % | TE % | Note |
|---|---|---|---|---|---|---|---|---|---|---|---|---|
| 1 | A16 | 0 | 27 | 53 | 9 | 11 | 0.97 | 696 | 1133 | 10.5 | 14.9 | inv. |
| 2 | A16 | 0 | 20 | 59 | 9 | 12 | 0.96 | 735 | 1155 | 9.8 | 15.7 | inv. |
| 3 | A50 | 3 | 20 | 61.6 | 6 | 12.4 | 1.05 | 635 | 1055 | 11.1 | 14.9 | inv. |
| 4 | A50 | 3 | 20 | 57.1 | 9 | 13.9 | 1.07 | 661 | 1075 | 10.8 | 15.2 | inv. |
| 5 | A50 | 2 | 22.8 | 58 | 5 | 14.2 | 0.91 | 601 | 1041 | 12 | 16.8 | inv. |
| 6 | A51 | 0 | 26 | 59.1 | 3 | 11.9 | 0.95 | 619 | 960 | 12.1 | 16.7 | inv. |
| 7 | A51 | 0 | 23 | 62.5 | 3 | 11.5 | 0.96 | 628 | 983 | 11.3 | 15.7 | inv. |
| 8 | A51 | 0 | 27 | 59.4 | 3 | 10.6 | 0.91 | 576 | 963 | 13.4 | 19.4 | inv. |
| 9 | A51 | 5 | 30 | 57.5 | 3 | 9.5 | 0.96 | 564 | 973 | 12.5 | 18.6 | inv. |
| 10 | A53 | 6 | 42 | 48.2 | 2 | 7.8 | 0.95 | 540 | 869 | 14.8 | 22.1 | inv. |
| 11 | A53 | 5 | 35 | 53.4 | 3 | 8.6 | 0.97 | 525 | 864 | 15.5 | 21.1 | inv. |
| 12 | A53 | 5 | 34 | 53.9 | 3 | 9.1 | 0.98 | 511 | 866 | 15.6 | 23.4 | inv. |
| 13 | A54 | 5 | 23 | 53 | 11 | 13 | 0.96 | 646 | 1140 | 11.4 | 16 | inv. |
| 14 | A54 | 5 | 22 | 57.1 | 9 | 11.9 | 0.91 | 639 | 1127 | 11.5 | 16.9 | inv. |
| 15 | A54 | 5 | 20 | 56.1 | 11 | 12.9 | 0.94 | 671 | 1143 | 10.5 | 15.2 | inv. |
| 16 | A54 | 11 | 31 | 43.4 | 12 | 13.6 | 1.02 | 586 | 1149 | 12.3 | 17.8 | inv. |
| 17 | A72 | 6 | 41 | 39 | 8.7 | 11.3 | 1.16 | 600 | 988 | 12.7 | 17.9 | inv. |
| 18 | A73 | 3 | 23 | 49 | 18 | 10 | 0.94 | 715 | 1247 | 10.2 | 14.9 | inv. |
| 19 | A73 | 19 | 34 | 36 | 20 | 10.1 | 0.93 | 685 | 1256 | 10.5 | 14.8 | inv. |
| 20 | A74 | 28 | 54 | 35 | 12.5 | 8.5 | 0.97 | 508 | 1008 | 13.1 | 18.6 | inv. |
| 21 | A75 | 25 | 41 | 33.6 | 16 | 9.4 | 1.01 | 681 | 1194 | 10.5 | 16 | inv. |
| 22 | A75 | 12 | 32 | 46 | 12.3 | 9.7 | 0.90 | 611 | 1181 | 12.2 | 16.6 | inv. |
| 23 | A75 | 43 | 54 | 21 | 17 | 8.1 | 0.92 | 586 | 1189 | 11.4 | 15.2 | inv. |
| 24 | A75 | 34 | 55 | 21.6 | 14.5 | 8.9 | 0.91 | 580 | 1191 | 11.2 | 15.9 | inv. |
| 25 | A75 | 23 | 53 | 26 | 12 | 8.8 | 0.92 | 550 | 1216 | 11.8 | 15.1 | inv. |
| 26 | A79 | 15 | 28 | 39 | 23 | 10.2 | 0.89 | 712 | 1271 | 9.1 | 13.1 | comp. |
| 27 | A79 | 9 | 34 | 37 | 24.2 | 4.8 | 0.71 | 686 | 1347 | 8.6 | 11.4 | comp. |
| 28 | A95 | 4 | 20 | 56 | 11 | 13.2 | 0.99 | 676 | 1181 | 10.5 | 14.7 | inv. |
| 29 | A96 | 5 | 26 | 53.6 | 4 | 16.4 | 1.02 | 575 | 983 | 13.7 | 18.2 | inv. |
| 30 | A96 | 2 | 27 | 56.8 | 1 | 15.2 | 1.00 | 552 | 1009 | 14.9 | 19.7 | inv. |
| 31 | A97 | 2 | 22 | 56.2 | 8 | 13.8 | 1.11 | 686 | 1096 | 12.1 | 17.6 | inv. |
| 32 | A97 | 3 | 25 | 51.1 | 8 | 15.9 | 0.98 | 677 | 1088 | 11 | 15.5 | inv. |
| 33 | A98 | 0 | 25 | 57 | 1 | 17 | 1.02 | 631 | 1058 | 11 | 15.7 | inv. |
| 34 | A98 | 5 | 30 | 52.6 | 1 | 16.4 | 0.92 | 635 | 1059 | 12.6 | 16.9 | inv. |
| 35 | A99 | 0 | 16 | 55 | 15 | 13.7 | 1.06 | 658 | 1226 | 12 | 16.4 | inv. |

The invention claimed is:

1. A method of heat treating a cold rolled steel strip, which method comprises the steps of:
   prior to step a), heating an uncoated cold rolled steel strip from a first temperature, wherein first temperature is room temperature, to a temperature T1 in the range of 680-740° C. at a single constant heating rate V1 of 15.0-25.0° C./s; and further heating the uncoated cold rolled steel strip from the temperature T1 to a soaking temperature T2 within a soaking temperature range of (Ac3−60° C.) to (Ac3+20° C.) at a heating rate V2 of 0.5-4.0° C./s;
   a) soaking the uncoated cold rolled steel strip at the soaking temperature T2 within the soaking temperature range of (Ac3−60° C.) to (Ac3+20° C.) for a soaking time t2 of 1-100 seconds, thereby obtaining a cold rolled steel strip having an at least partially austenitic microstructure;
   b) cooling the uncoated soaked steel strip resulting from step a) to a temperature T4 in the range of Bn-Ms, wherein acicular ferrite is formed during the cooling in a temperature range between Bs and Ms, wherein step b) comprises a substep of cooling the soaked steel strip from step a) to a temperature T3 in the range of 750-550° C. at a cooling rate V3 of 2.0° C./s to 15° C./s; and
   wherein step b) comprises a substep of cooling the soaked steel strip from a temperature T3, to T4 at a cooling rate V4 of 20.0-60.0° C./s;
   c) heat treating the uncoated cooled strip obtained in step b) in a range between the temperature Bn-(Ms+50) for a period of time t5 of 40-120 seconds, by heating to increase temperature from T4 to a temperature T5 between T4 and Bs;
   c1) optionally a coating step of coating the heat treated steel strip with a protective coating following the heat treating of step c),
   d) cooling the heat treated, optionally coated, steel strip to a temperature T7 in the range of ((Ms−50) to Mf) at a cooling rate of V7 of 5.0-10.0° C./s and further cooling the heat treated, optionally coated, steel strip to ambient temperature at a cooling rate of V8 of 5.0-20.0° C./s;
   such that the heat treated, optionally coated, steel strip has a microstructure (in vol. %) comprising:
   polygonal ferrite (PF)+acicular ferrite (AF)+carbide-free higher bainitic ferrite (HBF): 25-55;
   polygonal ferrite (PF): 0-45;
   carbide-free lower bainitic ferrite (LBF): 30-65;
   retained austenite (RA): 5-20;
   fresh martensite (M): 0-20;
   wherein the steel strip has a composition (in mass %) comprising:
   C: 0.15-0.35;
   Mn: 1.50-3.00;
   Si: 0.50-2.00;
   Al: 0.01-1.50;

P: less than 0.050;
S: less than 0.020;
N: less than 0.0080;
wherein the sum (Si+Al) is ≥0.60; and
optionally one or more elements selected from
  0<Cr≤0.35;
  0<Cu≤0.20;
  0<Ni≤0.50;
  0<Mo≤0.30;
  0<Nb≤0.10;
  0<V≤0.10;
  0<Ti≤0.10;
  0<B≤0.0030;
  0<Ca≤0.0050;
  0<REM≤0.0100, wherein REM is one or more rare earth metals;
and the remainder being iron and inevitable impurities,
  wherein the steel strip resulting from step d) has Tensile strength (TS)≥850 MPa; and
  wherein the steel strip resulting from step d) has:
  Yield strength (YS)≥500 MPa; and
  Total elongation (TE)≥14%.

2. The method according to claim 1, wherein step a) comprises soaking a cold rolled steel strip within a temperature range of (Ac3−50° C.)-(Ac3+10° C.).

3. The method according to claim 1, wherein step b) comprises cooling the soaked steel strip from step a) to the temperature T4 at a cooling rate sufficient to avoid pearlite formation.

4. The method according to claim 1, wherein the soaking temperature is (Ac3−50° C.)-(Ac3+10° C.).

5. The method according to claim 1, wherein step c) is performed at least partially by latent heat produced by the bainite transformation.

6. The method according to claim 1, comprising a further heat treatment step between steps c) and d) or if step c1) is present between steps c) and c1), wherein the uncoated steel strip resulting from step c) undergoes heating to a temperature T6 in the range of Bs-Bn for a period of time t6.

7. The method according to claim 1, wherein the step c1) is performed and comprises a hot dip galvanizing treatment and comprises a further heat treatment step wherein the steel strip resulting from step c) undergoes heating to a temperature T6 in the range of Bs-Bn for a period of time t6.

8. The method according to claim 1, wherein the step c1) is performed.

9. The method according to claim 1, wherein the microstructure comprises in vol. %:
polygonal ferrite (PF)+acicular ferrite (AF)+carbide-free higher bainitic ferrite (HBF): 25-50;
polygonal ferrite (PF): 10-40;
carbide-free lower bainitic ferrite (LBF): 30-60;
retained austenite (RA): 7-15;
fresh martensite (M): 0-15;
and/or wherein the C content in retained austenite (RA) is 0.90 wt. % or more.

10. The method according to claim 1, wherein carbide free bainitic ferrite is formed when the temperature in step b is in a range between Bs and Ms,
  wherein carbide free high bainitic ferrite is formed when the temperature in step b is in a range between Bs and Bn,
wherein carbide free low bainitic ferrite is formed when the temperature in step b is in a range between Bn and Ms.

11. The method according to claim 1, wherein the heat treated, optionally coated, steel strip has:
at least 11% PF.

12. The method according to claim 1, wherein the heat treated, optionally coated, steel strip has:
0.01-0.321% Al;
at least 1.17% Si; and
AF is present.

13. A heat treated cold rolled steel strip made by the method of claim 1 and having a composition (in mass %) comprising
C: 0.15-0.35;
Mn: 1.50-3.00;
Si: 0.50-2.00;
Al: 0.01-1.50;
P: less than 0.050;
S: less than 0.020;
N: less than 0.0080;
wherein the sum (Si+Al) is ≥0.60; and
optionally one or more elements selected from
  0<Cr≤0.35;
  0<Cu≤0.20;
  0<Ni≤0.50;
  0<Mo≤0.30;
  0<Nb≤0.10;
  0<V≤0.10;
  0<Ti≤0.10;
  0<B≤0.0030;
  0<Ca≤0.0050;
  0<REM≤0.0100, wherein REM is one or more rare earth metals;
and the remainder being iron and inevitable impurities;
and a microstructure (in vol. %) comprising
polygonal ferrite (PF)+acicular ferrite (AF)+higher bainitic ferrite (HBF): 20-55;
polygonal ferrite (PF): 0-45;
lower bainitic ferrite (LBF): 20-65;
retained austenite (RA): 5-20;
fresh martensite (M): 0-20;
  wherein the steel strip resulting from step d) has Tensile strength (TS)≥850 MPa; and
  wherein the steel strip resulting from step d) has:
  Yield strength (YS)≥500 MPa; and
  Total elongation (TE)≥14%.

14. A method of heat treating a cold rolled steel strip, which method comprises the steps of:
prior to step a) heating an uncoated cold rolled steel strip from room temperature to a temperature T1 in the range of 680-740° C. at a single constant heating rate V1 of 15.0-25.0° C./s; and further heating the uncoated cold rolled steel strip from the temperature T1 to a soaking temperature T2 within a soaking temperature range of (Ac3−60° C.) to (Ac3+20° C.) at a heating rate V2 of 0.5-4.0° C./s;
a) soaking the uncoated cold rolled steel strip at the soaking temperature T2 within the soaking temperature range of (Ac3−60° C.) to (Ac3+20° C.) for a soaking time t2 of 1-100 seconds, thereby obtaining a cold rolled steel strip having an at least partially austenitic microstructure;
b) cooling the uncoated soaked steel strip resulting from step a) to a temperature T4 in the range of Bn-Ms, wherein acicular ferrite is formed during the cooling in a temperature range between Bs and Ms; wherein step b) comprises a substep of cooling the soaked steel strip from step a) to a temperature T3 in the range of 750-550° C. at a cooling rate V3 of 2.0° C./s to 15° C./s; and
wherein step b) comprises a substep of cooling the soaked steel strip from a temperature T3, to T4 at a cooling rate V4 of 20.0-60.0° C./s;

c) heat treating the uncoated cooled strip obtained in step b) in a range between the temperature Bn-(Ms+50) for a period of time t5 of 40-120 seconds, by heating to increase temperature from T4 to a temperature T5 between T4 and Bs;

c1) optionally a coating step of coating the heat treated steel strip with a protective coating following the heat treating of step c), d) cooling the heat treated, optionally coated, steel strip to a temperature T7 in the range of ((Ms−50) to Mf) at a cooling rate of V7 of 5.0-10.0° C./s and further cooling the heat treated, optionally coated, steel strip to ambient temperature at a cooling rate of V8 of 5.0-20.0° C./s;

such that the heat treated, optionally coated, steel strip has a microstructure (in vol. %) consisting of:

polygonal ferrite (PF)+acicular ferrite (AF)+carbide-free higher bainitic ferrite (HBF): 25-55;
polygonal ferrite (PF): 0-45;
carbide-free lower bainitic ferrite (LBF): 30-65;
retained austenite (RA): 5-20;
fresh martensite (M): 0-20;
cementite+pearlite: less than 5;

wherein the steel strip has a composition (in mass %) comprising:
C: 0.15-0.35;
Mn: 1.50-3.00;
Si: 0.50-2.00;
Al 0.01-1.50;
P: less than 0.050;
S: less than 0.020;
N: less than 0.0080;
wherein the sum (Si+Al) is ≥0.60; and
optionally one or more elements selected from
0<Cr≤0.35;
0<Cu≤0.20;
0<Ni≤0.50;
0<Mo≤0.30;
0<Nb≤0.10;
0<V≤0.10;
0<Ti≤0.10;
0<B≤0.0030;
0<Ca≤0.0050;
0<REM≤0.0100, wherein REM is one or more rare earth metals;
and the remainder being iron and inevitable impurities,
wherein the steel strip resulting from step d) has Tensile strength (TS)≥850 MPa; and
wherein the steel strip resulting from step d) has:
Yield strength (YS)≥500 MPa; and
Total elongation (TE)≥14%.

15. A method of heat treating a cold rolled steel strip, which method comprises the steps of:
prior to step a), heating an uncoated cold rolled steel strip from room temperature to a temperature T1 in the range of 680-740° C. at a single constant heating rate V1 of 15.0-30.0° C./s; and further heating the uncoated cold rolled steel strip from the temperature T1 to a soaking temperature T2 within a soaking temperature range of (Ac3−60° C.) to (Ac3+20° C.) at a heating rate V2 of 0.5-4.0° C./s;

a) soaking the uncoated cold rolled steel strip at the soaking temperature T2 within the soaking temperature range of (Ac3−60° C.) to (Ac3+20° C.) for a soaking time t2 of 1-86 seconds, thereby obtaining a cold rolled steel strip having an at least partially austenitic microstructure;

b) cooling the uncoated soaked steel strip resulting from step a) to a temperature T4 in the range of Bn-Ms, wherein acicular ferrite is formed during the cooling at a temperature between Bs and Ms, wherein step b) comprises a substep of cooling the soaked steel strip from step a) to a temperature T3 in the range of 750-550° C. at a cooling rate V3 of 2.0° C./s to 15° C./s; and
wherein step b) comprises a substep of cooling the soaked steel strip from a temperature T3 in the range of 750-550° C., to T4 at a cooling rate V4 of 20.0-60.0° C./s;

c) heat treating the uncoated cooled strip obtained in step b) at a temperature between Bn-(Ms+50) for a period of time t5 of 40-120 seconds, by heating to increase temperature from T4 to a temperature T5 between T4 and Bs;

c1) optionally a coating step of coating the heat treated steel strip with a protective coating following the heat treating of step c), d) cooling the heat treated, optionally coated, steel strip to a temperature T7 in the range of ((Ms−50) to Mf) at a cooling rate of V7 of 5.0-10.0° C./s and further cooling the heat treated, optionally coated, steel strip to ambient temperature at a cooling rate of V8 of 5.0-20.0° C./s;

such that the heat treated, optionally coated, steel strip has a microstructure (in vol. %) comprising:
polygonal ferrite (PF)+acicular ferrite (AF)+higher bainitic ferrite (HBF): 25-55;
polygonal ferrite (PF): 0-45;
lower bainitic ferrite (LBF): 30-65;
retained austenite (RA): 5-20;
fresh martensite (M): 0-20;
wherein the steel strip has a composition (in mass %) comprising
C: 0.15-0.35;
Mn: 1.50-3.00;
Si: 0.50-2.00;
Al: 0.01-1.50;
P: less than 0.050;
S: less than 0.020;
N: less than 0.0080;
wherein the sum (Si+Al) is ≥0.60; and
optionally one or more elements selected from
0<Cr≤0.35;
0<Cu≤0.20;
0<Ni≤0.50;
0<Mo≤0.30;
0<Nb≤0.10;
0<V≤0.10;
0<Ti≤0.10;
0<B≤0.0030;
0<Ca≤0.0050;
0<REM≤0.0100, wherein REM is one or more rare earth metals;
and the remainder being iron and inevitable impurities,
wherein the steel strip resulting from step d) has Tensile strength (TS)≥850 MPa; and
wherein the steel strip resulting from step d) has at least one of the properties:
Yield strength (YS)≥500 MPa; and
Total elongation (TE)≥14%.

* * * * *